(12) United States Patent
Syu

(10) Patent No.: US 9,753,847 B2
(45) Date of Patent: Sep. 5, 2017

(54) NON-VOLATILE SEMICONDUCTOR MEMORY SEGREGATING SEQUENTIAL, RANDOM, AND SYSTEM DATA TO REDUCE GARBAGE COLLECTION FOR PAGE BASED MAPPING

(75) Inventor: Mei-Man Syu, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 1367 days.

(21) Appl. No.: 12/607,011

(22) Filed: Oct. 27, 2009

(65) Prior Publication Data
US 2011/0099323 A1    Apr. 28, 2011

(51) Int. Cl.
*G06F 12/02* (2006.01)

(52) U.S. Cl.
CPC .. *G06F 12/0246* (2013.01); *G06F 2212/7205* (2013.01); *Y02B 60/1225* (2013.01)

(58) Field of Classification Search
None
See application file for complete search history.

(56) References Cited

U.S. PATENT DOCUMENTS

| | | |
|---|---|---|
| 6,856,556 B1 | 2/2005 | Hajeck |
| 7,126,857 B2 | 10/2006 | Hajeck |
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,509,471 B2 | 3/2009 | Gorobets |
| 7,596,643 B2 | 9/2009 | Merry, Jr. et al. |
| 7,631,162 B2 | 12/2009 | Gorobets |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |

(Continued)

FOREIGN PATENT DOCUMENTS

| | | |
|---|---|---|
| CN | 1722109 | 1/2006 |
| CN | 1914689 | 2/2007 |
| CN | 101382917 | 3/2009 |

OTHER PUBLICATIONS

Chinese Office Action dated Jun. 5, 2014 from related Chinese Application Serial No. 201010526407.X, 21 pages.

*Primary Examiner* — Gary W Cygiel
(74) *Attorney, Agent, or Firm* — McDermott Will & Emery LLP

(57) ABSTRACT

A non-volatile semiconductor memory is disclosed comprising a memory device having a memory array including a plurality of memory segments. A plurality of sequential access write commands and random access write commands are received from a host, wherein each write command identifies at least one logical block address (LBA). The LBAs for the sequential access write commands are mapped to a plurality of the memory segments to generate sequential mapping data, and the sequential mapping data is mapped to a first one of the zones. The LBAs for the random access write commands are mapped to a plurality of the memory segments to generate random mapping data, and the random mapping data is mapped to a second one of the zones.

10 Claims, 6 Drawing Sheets

(56) References Cited

U.S. PATENT DOCUMENTS

| | | |
|---|---|---|
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,339,636 B2 | 12/2012 | Yamada et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2005/0144360 A1 * | 6/2005 | Bennett et al. ............... 711/103 |
| 2005/0166206 A1 | 7/2005 | Parson |
| 2008/0256287 A1 | 10/2008 | Lee et al. |
| 2008/0270680 A1 * | 10/2008 | Chang ............................ 711/103 |
| 2008/0307192 A1 | 12/2008 | Sinclair et al. |
| 2009/0019218 A1 | 1/2009 | Sinclair et al. |
| 2009/0150599 A1 | 6/2009 | Bennett |
| 2009/0271562 A1 | 10/2009 | Sinclair |
| 2010/0095055 A1 | 4/2010 | Gorobets |
| 2010/0095084 A1 | 4/2010 | Manning |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

* cited by examiner

GLOBAL MAPPING

| LBA 0   | Z1P0    |
|---------|---------|
| LBA 1   | Z1P1    |
| LBA 2   | Z23P2456 |
| LBA 3   | Z4P35   |
| LBA 4   | Z63P4467 |
| .       | .       |
| .       | .       |
| .       | .       |
| LBA N-1 | ZYPY    |
| LBA N   | ZZPZ    |

} N PAGES

FIG. 5A

SEQ. MAPPING

| LBA 0   | Z4P0   |
|---------|--------|
| LBA 1   | Z4P1   |
| LBA 2   | Z4P2   |
| LBA 3   | Z4P3   |
| LBA 4   | Z4P4   |
| .       | .      |
| .       | .      |
| .       | .      |
| LBA 510 | Z4P510 |
| LBA 511 | Z4P511 |

} 1 PAGE

FIG. 5B

RANDOM/SYSTEM MAPPING

| LBA 45345  | Z10P0   |
|------------|---------|
| LBA 955346 | Z14P400 |
| .          | .       |
| .          | .       |
| .          | .       |
| LBA 63098  | Z40P325 |
| LBA 765900 | Z18P75  |

} 1 PAGE

FIG. 5C

NON-VOLATILE SEMICONDUCTOR MEMORY SEGREGATING SEQUENTIAL, RANDOM, AND SYSTEM DATA TO REDUCE GARBAGE COLLECTION FOR PAGE BASED MAPPING

BACKGROUND

A non-volatile semiconductor memory may be employed as mass storage for a computer system (e.g., desktop, laptop, portable, etc.) or a consumer device (e.g., music player, cell phone, camera, etc.) or other suitable application. The non-volatile semiconductor memory may comprise one or more memory devices (such as a flash memory) and control circuitry for accessing each memory device. Each memory device is coupled to an I/O bus, as well as a number of interface control lines. When issuing a program command or an erase command to a memory device, the control circuitry transfers the address and command data (and write data for a program operation) over the I/O bus. When issuing a read command, the control circuitry transfers the address and command data over the I/O bus and then receives the read data over the I/O bus.

Each memory device typically comprises a number of blocks which are accessed a page at a time. For example, a single block may comprise 128 pages where each page comprises 4k bytes. Since a page typically cannot be overwritten without first being erased, a new page in a different block is typically selected to perform an "overwrite" operation. To facilitate relocating data to a different page, the non-volatile semiconductor memory implements indirect accessing wherein a logical block address (LBA) representing a data block is mapped to a physical block address (PBA) representing one of the pages. In this manner, when the page for a data block is moved, the LBA is simply reassigned to the new PBA.

Periodically the non-volatile semiconductor memory will perform a garbage collection operation wherein the remaining valid pages of a first block are relocated to a second block so that the first block can be erased (thereby erasing the invalid pages that were previously relocated during overwrite operations). It is desirable to minimize the amount of garbage collection in a non-volatile semiconductor memory in order to decrease write amplification and power consumption, as well as increase endurance and performance.

BRIEF DESCRIPTION OF THE DRAWINGS

FIG. 5A shows a global LBA/PBA map accessed while in volatile memory according to an embodiment of the present invention.

FIG. 5B shows a sequential log for storing mapping data for sequential access write commands, wherein the sequential log for updating the global LBA/PBA map in the event of a power failure.

FIG. 5C shows a random/system log for storing mapping data for random/system access write commands, wherein the random/system log for updating the global LBA/PBA map in the event of a power failure.

DETAILED DESCRIPTION OF EMBODIMENTS OF THE INVENTION

Figure 1:
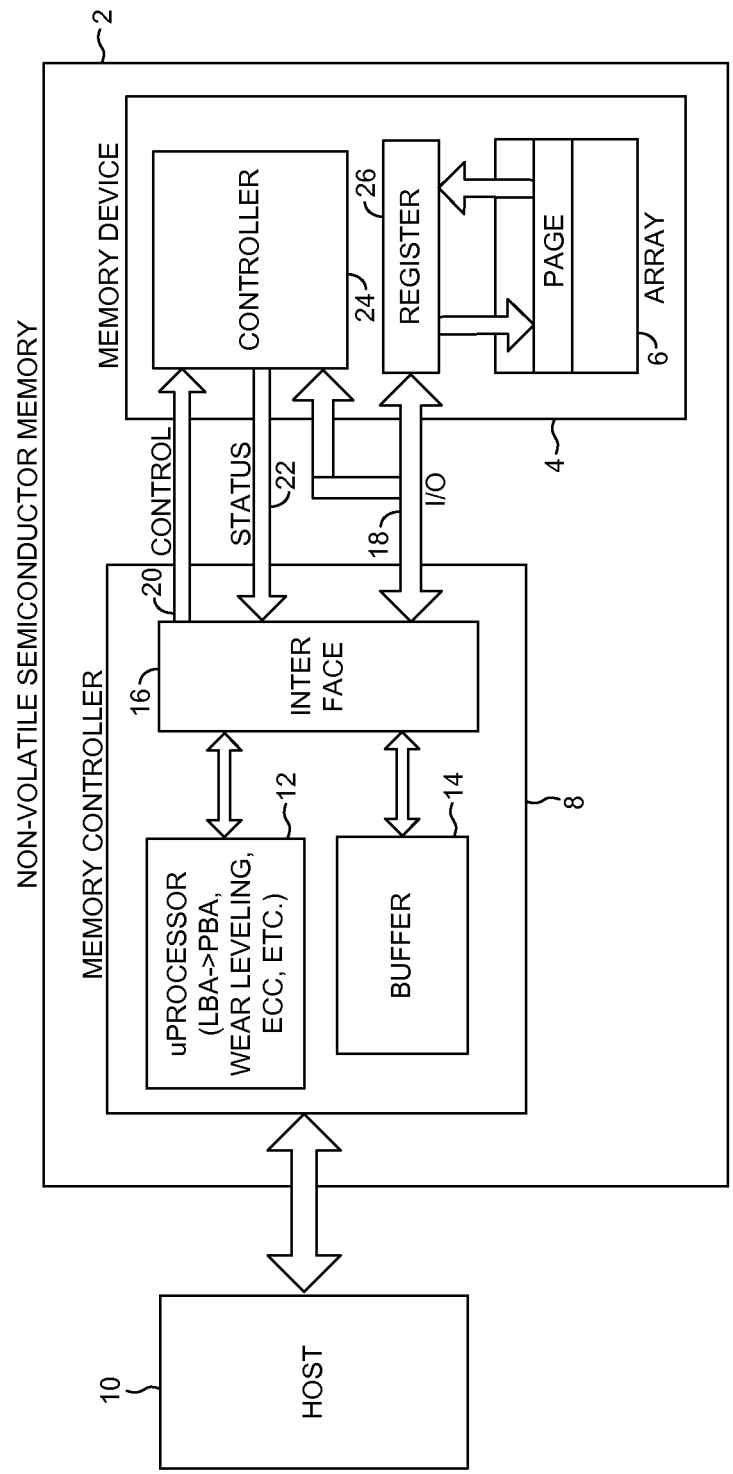
FIG. 1 shows a non-volatile semiconductor memory comprising a memory device having a memory array including a plurality of memory segments according to an embodiment of the present invention.

FIG. 1 shows a non-volatile semiconductor memory 2 comprising a memory device 4 having a memory array 6 including a plurality of memory segments, and control circuitry 8 for defining a plurality of zones each comprising a plurality of the memory segments. A plurality of sequential access write commands are received from a host 10 to write sequential data to the memory device 4, wherein each sequential access write command identifies at least one logical block address (LBA). A plurality of random access write commands are received from the host 10 to write random data to the memory device 4, wherein each random access write command identifies at least one LBA. The LBAs for the sequential access write commands are mapped to a plurality of the memory segments to generate sequential mapping data, and the sequential mapping data is mapped to a first one of the zones. The LBAs for the random access write commands are mapped to a plurality of the memory segments to generate random mapping data, and the random mapping data is mapped to a second one of the zones.

The non-volatile semiconductor memory 2 may comprise any suitable configuration of control circuitry 8 and memory device 4. In the embodiment of FIG. 1, the memory device 4 comprises a suitable flash memory (e.g., NAND or NOR flash), and the control circuitry comprises a flash memory controller 8 including a microprocessor 12 for implementing various algorithms (e.g., LBA to PBA mapping, error correction coding (ECC), wear leveling, etc.). The memory controller 8 further comprises a buffer 14 for buffering write/read data in volatile memory (e.g., DRAM), and suitable interface circuitry 16 for interfacing with the memory device 4. The memory device 4 is coupled to an I/O bus 18, as well as a number of interface control lines 20. When issuing a program command or an erase command to the memory device 4, the microprocessor 12 transfers the address and command data (and write data for a program operation) over the I/O bus 18. When issuing a read command, the microprocessor 12 transfers the address and command data over the I/O bus 18 and then receives the read data over the I/O bus 18. In one embodiment, the microprocessor 12 receives status information 22 from the memory device 4 to determine when it has completed a write/read operation.

The memory device 4 in the embodiment of FIG. 1 comprises a controller 24 for receiving the control signals and command data from the interface circuitry 16. For example, the command data may comprise address information for writing data to a particular memory segment in the memory array 6. The write data is buffered in a data register 26 and when the controller 24 receives a flush command, the controller 24 transfers the data buffered in the data register 26 to a target memory segment (page) in the memory array 6.

In one embodiment, the memory controller 8 implements a solid state drive (SSD) by emulating a disk drive accessible by a host system using a standard disk drive communication protocol (e.g., the ATA protocol). The host 10 in this embodiment may comprise a separate microprocessor (e.g., in a desktop or laptop computer) which communicates with the SSD over a suitable interface (e.g., serial or parallel ATA). In an alternative embodiment, the non-volatile semiconductor memory 2 may be implemented within a consumer device (e.g., a camera or cell phone), wherein the host 10 may be implemented as a firmware component executed by the same microprocessor 12 for implementing the memory controller 8.

In one embodiment, the memory array 6 in the memory device 4 comprises a plurality of blocks, where each block comprises a plurality of pages. In one embodiment, a page must be erased before it is written. A page is therefore "overwritten" by writing the new data to a different page (typically in a different block), remapping the LBA to the new PBA, and invalidating the old page. Periodically, the invalid pages of a block are recovered during a garbage collection procedure by copying the valid page of a block to a new block, and then erasing the entire block.

Figure 2:
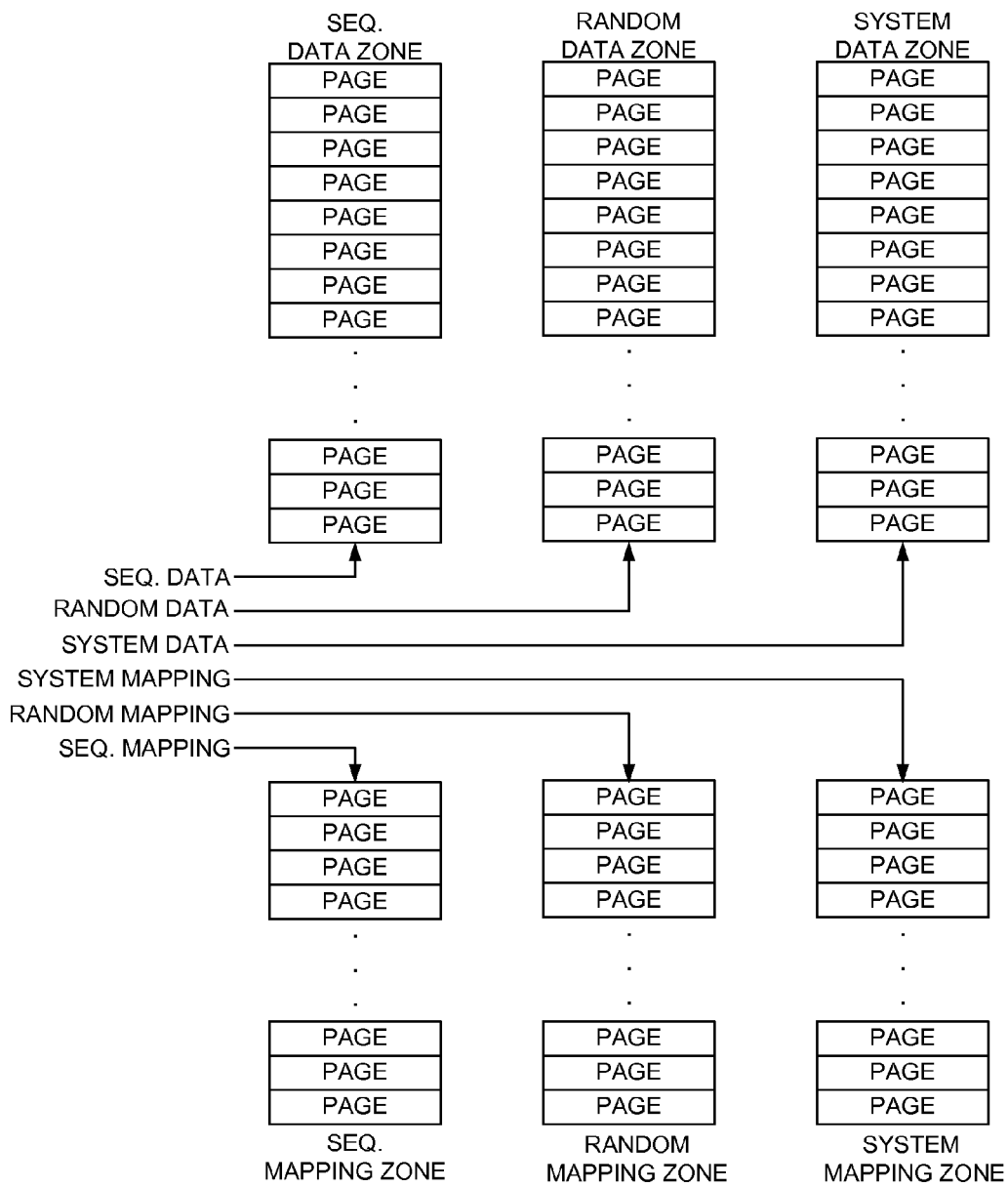
FIG. 2 shows an embodiment of the present invention wherein mapping data for system data, random data, and sequential data is stored in respective mapping zones.

The memory controller 8 defines a number of zones by allocating a number of blocks to each zone, wherein each zone stores write data or mapping data associated with sequential access write commands, random access write commands, or system access write commands as illustrated in FIG. 2. In one embodiment, the blocks may be dynamically allocated to each zone as needed. Segregating the write data as well as the mapping data into respective zones may help reduce the amount of garbage collection within each zone by reducing the number of blocks storing both valid and invalid pages. That is, if the write data and the mapping data are segregated, it increases the likelihood that an entire block will be overwritten within a zone such that the block can be erased without relocating valid pages.

Figure 3A:
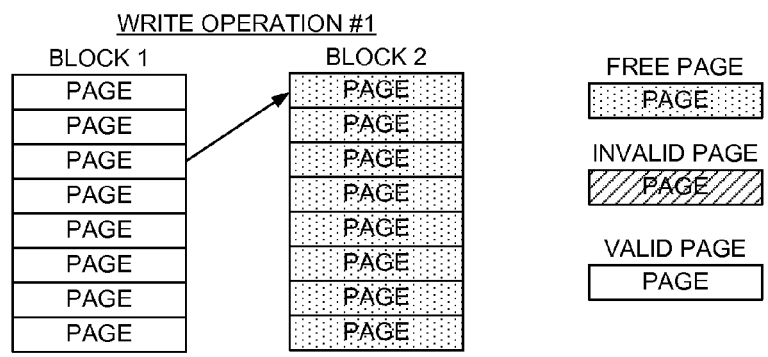
FIGS. 3A-3D illustrate an embodiment of the present invention wherein a page based mapping scheme is used to address the memory segments (pages in this embodiment).
Figure 3B:
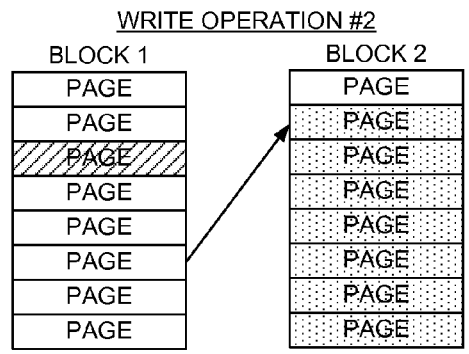
Figure 3C:
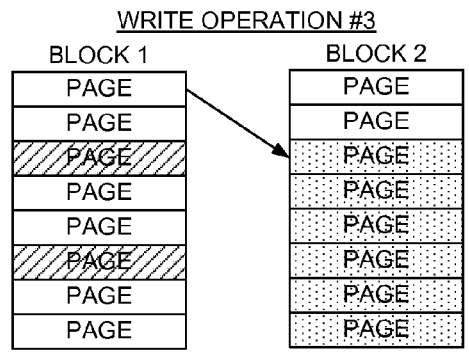
Figure 3D:
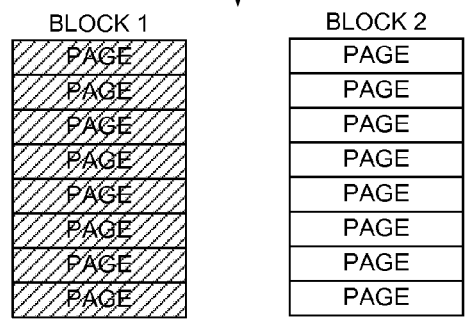

This concept is understood with reference to FIGS. 3A-3D which illustrates a page based mapping scheme according to an embodiment of the present invention. With page based mapping, each LBA may be mapped to the PBA of any page within any block. When writing data having a first LBA mapped to a first page of a first block to a second page of a second block, valid pages of the first block are not relocated to the second block as with block based mapping. This is illustrated in FIGS. 3A and 3B wherein during a write operation the write data is written to a page in a second block and the corresponding page in a first block is invalidated. This process is repeated during subsequent write operations for different pages as illustrated in FIGS. 3B and 3C until all of the pages of the first block have been invalidated as illustrated in FIG. 3D. The first block is then erased so that it can be re-allocated without needing to relocate any valid pages (because there are no valid pages).

Figure 4A:
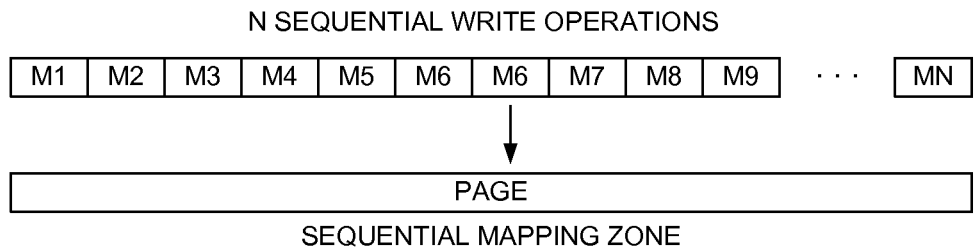
FIGS. 4A-4C illustrate an embodiment of the present invention wherein mapping data for a number of write commands are buffered in volatile memory before being written to the non-volatile memory.
Figure 4B:
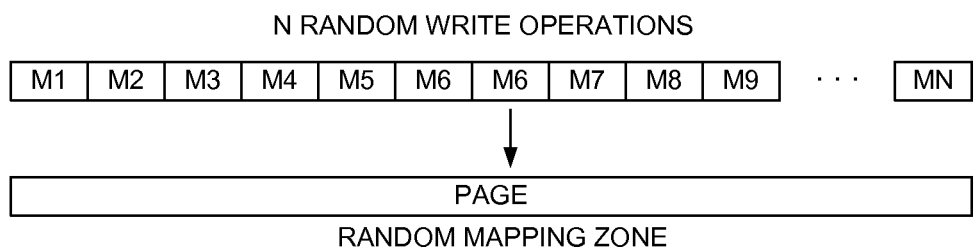
Figure 4C:
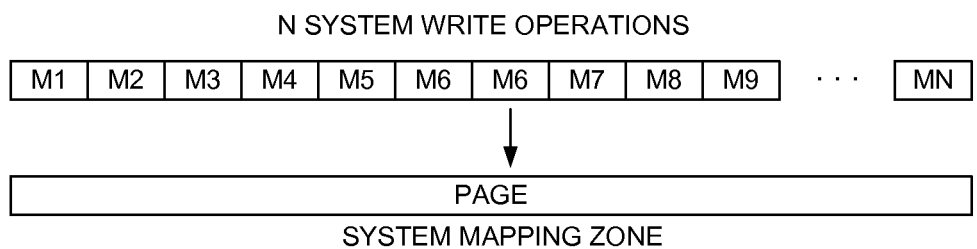

During each write operation, the LBA to PBA mapping is updated to reflect the relocation of pages or to reflect the allocation of a new page for a new LBA. In addition, the mapping data is periodically written to the memory device 4 so that the mapping is preserved in the event of a power failure. In one embodiment illustrated in FIGS. 4A-4C, the mapping data for a number of write commands is cached in the volatile memory before being written to the memory device 4. For example, in one embodiment the mapping data is not written to the memory device 4 until enough write commands have been executed to fill up an entire page with mapping data. Once a page of mapping data has been cached, the mapping data is written to a page of the memory array. This reduces the number of write operations to the memory array (and associated fragmentation of the memory array) as compared to writing partial pages of mapping data at a time.

FIG. 5A shows an embodiment of the present invention wherein a global LBA to PBA map is stored in the memory device 4 and read into a volatile memory of the memory controller 8 when powered on. When a write command is executed by the memory controller 8, the global map in the volatile memory is updated to reflect the change in the LBA to PBA mapping. Mapping data is also stored in a write log corresponding to the type of write operation (sequential, random, or system). The write logs are then periodically stored in the memory device 4 so that the mapping data is preserved in the event of a power failure. The write logs are much smaller than the global map and therefore saving the write logs to the memory device 4 requires less time and results in less write amplification as compared to saving the entire global map to the memory device 4. If a power failure occurs, the write logs are read from the memory device 4 and used to update the global map. The global map is also periodically saved to the memory device 4 but much less frequently than the write logs.

FIG. 5B shows part of an example write log storing mapping data associated with a sequential access write command. With a sequential access the LBAs and corresponding PBAs are consecutive, and therefore only the starting LBA is stored (LBA 0 in the example of FIG. 5B) together with the consecutive PBAs (zone and page number within the zone). In an alternative embodiment, the start PBA is stored together with the run-length of PBAs which may require even less memory space. FIG. 5C shows part of an example write log storing mapping data associated with either a random access write command or a system access write command. Because the mapping of LBA to PBA is random, the write log stores both the LBA and the PBA for each corresponding page (zone and page number within the zone). FIGS. 5B and 5C also illustrate that in one embodiment each write log stores enough mapping data to fill one page, wherein the write log is saved to the memory device 4 once enough write operations have been executed to fill the write log.

Figure 6:
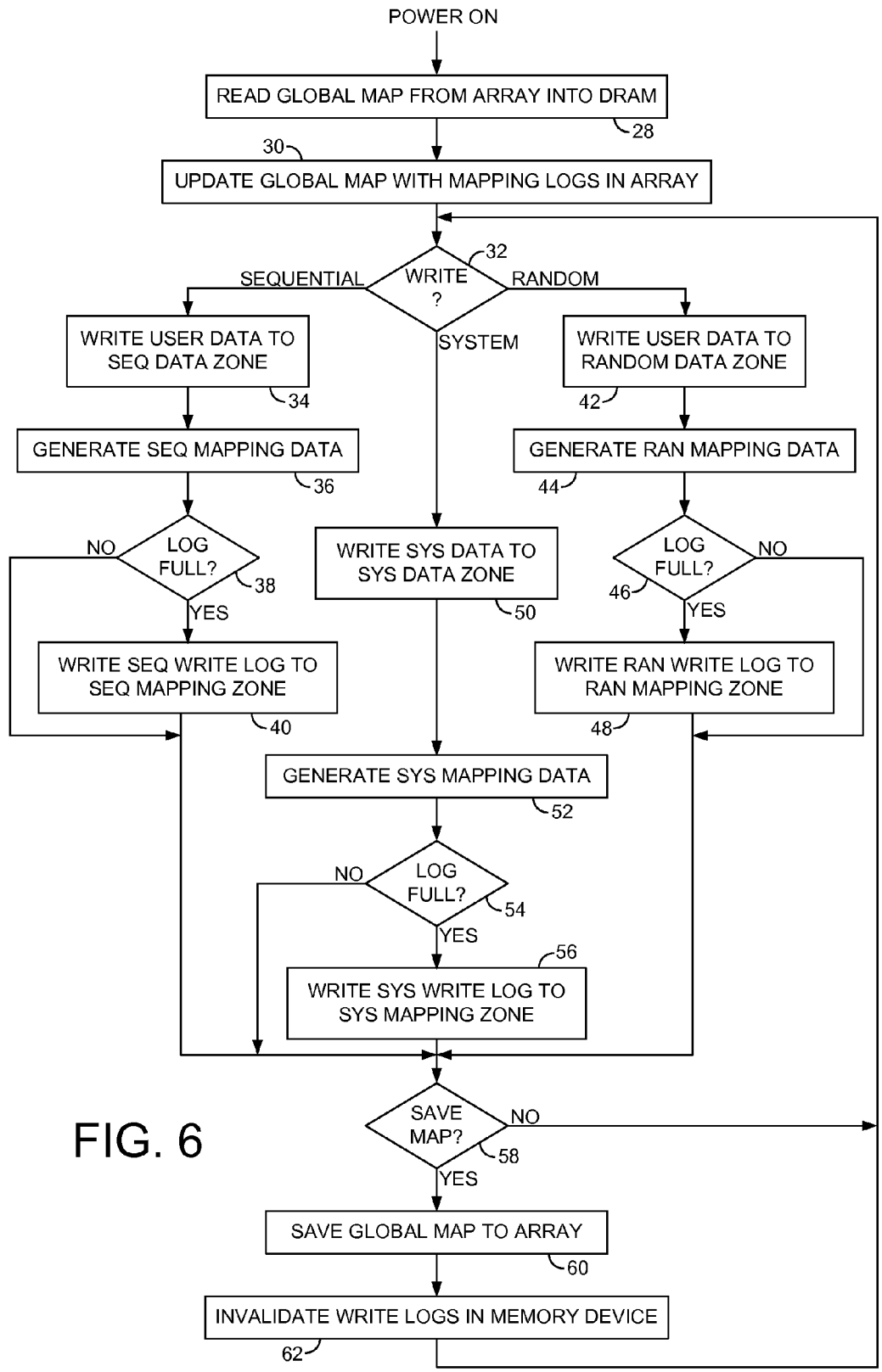
FIG. 6 is a flow diagram according to an embodiment of the present invention wherein a full page of mapping data is stored in each write log before they are written to the non-volatile memory, and periodically the global LBA/PBA map is written to the non-volatile memory.

FIG. 6 is a flow diagram according to an embodiment of the present invention wherein when the non-volatile semiconductor memory is powered on, a global map is read from the memory device into a volatile memory (step 28). The mapping logs are read from the memory device and used to update the global map if needed (step 30). When a write command is received (step 32), the write data is written to the target zone depending on the type of write command. If the write command is a sequential access write command, the user data is written to a sequential data zone of the memory device (step 34) and sequential mapping data is generated and stored in the sequential write log(step 36). If the sequential write log is full (step 38), then the sequential write log is written to a sequential mapping zone of the memory device and the sequential write log purged to process subsequent sequential access write commands (step 40). If the write command is a random access write command, the user data is written to a random data zone of the memory device (step 42) and random mapping data is generated and stored in the random write log(step 44). If the random write log is full (step 46), then the random write log is written to a random mapping zone of the memory device and the random write log purged to process subsequent random access write commands (step 48). If the write command is a system access write command, the system data is written to a system data zone of the memory device (step 50) and system mapping data is generated and stored in the system write log(step 52). If the system write log is full (step 54), then the system write log is written to a system mapping zone of the memory device and the system write log purged to process subsequent system access write commands (step 56). After a predetermined interval (step 58), the global map is written to the memory device (step 60) and the write logs currently stored in the memory device are invalidated (step 62) since they are no longer needed to update the global map in the event of a power failure (until more write commands are processed).

The system data written to the memory device during a system access write command may include any suitable system data. For example, when the write logs are written to the memory device (at steps 40, 48 and 56 of FIG. 6), the write commands are system access write commands. The write logs are written to a system data zone and the corresponding mapping data is stored in the system write log. Other suitable system data may be generated during normal operation, such as system data associated with a garbage collection or wear leveling algorithm.

The memory controller 8 may identify a write command as being sequential or random in any suitable manner. In one embodiment, the write commands received from the host may include an identifier that specifies the type of write command. In another embodiment, new write commands are initially processed as random access write commands until a consecutive number of sequential write commands exceeds a predetermined threshold. Subsequent write commands are then processed as sequential access write commands until there is a break in the consecutive sequence.

What is claimed is:

1. A non-volatile semiconductor memory comprising:
a memory device comprising a memory array including a plurality of memory segments; and
control circuitry operable to:
allocate a first set of the plurality of memory segments to a first zone and a second set of the plurality of memory segments to a second zone, wherein the first zone is reserved for storing sequential data and the second zone is reserved for storing random data;
receive a plurality of sequential access write commands including sequential data from a host after said allocation of memory segments to the first zone, wherein each of the sequential access write commands identifies one or more logical block addresses (LBAs);
receive a plurality of random access write commands including random data from the host after said allocation of memory segments to the second zone, wherein each of the random access write commands identifies one or more LBAs;
map the LBAs identified by the sequential access write commands to one or more memory segments of the first zone to generate sequential mapping data including zone number and page number information associated with the one or more memory segments of the first zone;
store the sequential data in the one or more memory segments of the first zone;
allocate a third set of the plurality of memory segments to a third zone for storing sequential mapping data and store the sequential mapping data in the third zone;
map the LBAs identified by the random access write commands to one or more memory segments of the second zone to generate random mapping data including zone number and page number information associated with the one or more memory segments of the second zone;
store the random data in the one or more memory segments of the second zone; and
allocate a fourth set of the plurality of memory segments to a fourth zone for storing random mapping data and store the random mapping data in the fourth zone.

2. The non-volatile semiconductor memory as recited in claim 1, wherein the control circuitry is further operable to:
allocate a fifth set of the plurality of memory segments to a fifth zone for storing system data;
generate a plurality of system access write commands to write system data to the memory device, wherein each system access write command identifies one or more LBAs;
map the LBAs identified by the system access write commands to one or more memory segments of the fifth zone to generate system mapping data.

3. The non-volatile semiconductor memory as recited in claim 2, wherein:
the plurality of memory segments comprises a plurality of blocks, each block comprising a plurality of pages;
the control circuitry is further operable to erase a page by erasing an entire block;
the first zone comprises a first block;
the second zone comprises a second block; and
the third zone comprises a third block.

4. The non-volatile semiconductor memory as recited in claim 2, wherein the control circuitry is further operable to:
allocate a sixth set of the plurality of memory segments to a sixth zone for storing system mapping data and store the system mapping data in the sixth zone after executing the plurality of the system access write commands.

5. The non-volatile semiconductor memory as recited in claim 4, wherein the control circuitry is further operable to erase a block in one of the first, second, third, fourth, fifth or sixth zones without relocating valid pages from the block to another block.

6. A method of operating a non-volatile semiconductor memory comprising a memory device comprising a memory array including a plurality of memory segments, the method comprising:
allocating a first set of the plurality of memory segments to a first zone and a second set of the plurality of memory segments to a second zone, wherein the first zone is reserved for storing sequential data and the second zone is reserved for storing random data;
receiving a plurality of sequential access write commands including sequential data from a host after said allocating memory segments to the first zone, wherein each of the sequential access write commands identifies one or more logical block addresses (LBAs);
receiving a plurality of random access write commands including random data from the host after said allocating memory segments to the second zone, wherein each of the random access write commands identifies one or more LBAs;

mapping the LBAs identified by the sequential access write commands to one or more memory segments of the first zone to generate sequential mapping data including zone number and page number information associated with the one or more memory segments of the first zone;

storing the sequential data in the one or more memory segments of the first zone;

allocating a third set of the plurality of memory segments to a third zone for storing sequential mapping data and storing the sequential mapping data in the third zone;

mapping the LBAs identified by the random access write commands to one or more memory segments of the second zone to generate random mapping data including zone number and page number information associated with the one or more memory segments of the second zone;

storing the random data in the one or more memory segments of the second zone; and allocating a fourth set of the plurality of memory segments to a fourth zone for storing random mapping data and storing the random mapping data in the fourth zone.

7. The method as recited in claim 6, further comprising:

allocating a fifth set of the plurality of memory segments to a fifth zone for storing system mapping data;

generating a plurality of system access write commands to write system data to the memory device, wherein each system access write command identifies one or more LBAs;

mapping the LBAs identified by the system access write commands to one or more memory segments of the fifth zone to generate system mapping data.

8. The method as recited in claim 7, wherein:

the plurality of memory segments comprise a plurality of blocks, each block comprising a plurality of pages;

a page is erased by erasing an entire block;

the first zone comprises a first block;

the second zone comprises a second block; and the third zone comprises a third block.

9. The method as recited in claim 7, further comprising:

allocating a sixth set of the plurality of memory segments to a sixth zone for storing system mapping data and storing the system mapping data in the sixth zone after executing the plurality of the system access write commands.

10. The method as recited in claim 9, further comprising erasing a block in one of the first, second, third, fourth, fifth or sixth zones without relocating valid pages from the block to another block.

\* \* \* \* \*